(12) United States Patent
Wang et al.

(10) Patent No.: US 9,621,507 B2
(45) Date of Patent: Apr. 11, 2017

(54) CONTROL METHOD AND APPARATUS FOR DATA DISPLAY

(71) Applicant: TENCENT TECHNOLOGY (SHENZHEN) COMPANY LIMITED, Shenzhen (CN)

(72) Inventors: Yao Wang, Shenzhen (CN); Li Liu, Shenzhen (CN); Hui Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/101,424

(22) PCT Filed: May 18, 2015

(86) PCT No.: PCT/CN2015/079168
§ 371 (c)(1),
(2) Date: Jun. 3, 2016

(87) PCT Pub. No.: WO2015/176630
PCT Pub. Date: Nov. 26, 2015

(65) Prior Publication Data
US 2016/0315904 A1 Oct. 27, 2016

(30) Foreign Application Priority Data
May 23, 2014 (CN) .......................... 2014 1 0222962

(51) Int. Cl.
*H04L 12/58* (2006.01)
*H04L 29/06* (2006.01)
*H04L 29/08* (2006.01)

(52) U.S. Cl.
CPC .............. *H04L 51/34* (2013.01); *H04L 29/06* (2013.01); *H04L 29/08072* (2013.01);
(Continued)

(58) Field of Classification Search
CPC ...... H04L 29/06; H04L 51/24; H04L 67/2876
(Continued)

(56) References Cited

U.S. PATENT DOCUMENTS

| | | | |
|---|---|---|---|
| 2007/0198505 A1* | 8/2007 | Fuller | G06F 17/3087 |
| 2010/0262696 A1* | 10/2010 | Oshiba | H04M 1/7253 709/227 |

(Continued)

FOREIGN PATENT DOCUMENTS

| | | |
|---|---|---|
| CN | 103378978 A | 10/2013 |
| CN | 103379019 A | 10/2013 |

(Continued)

OTHER PUBLICATIONS

International Search Report and Written Opinion, International Application No. PCT/CN2015/079168, mailed Aug. 21, 2015.

*Primary Examiner* — Khanh Dinh
(74) *Attorney, Agent, or Firm* — Marshall, Gerstein & Borun LLP

(57) ABSTRACT

A control method and apparatus for data display are described. The method includes: receiving, by a first client at current time, first target data pushed by a second client; determining, by the first client, whether the first target data pushed by the second client has been received within a first predetermined time period before the current time; and determining, by the first client at least according to the number of times that the first target data is received within the first predetermined time period and whether the first target data received within the first predetermined time period has been displayed on the first client, whether to display, on the first client, the first target data received at the current time if the first client determines that the first client has received, within the first predetermined time period, the first target data pushed by the second client.

9 Claims, 4 Drawing Sheets

(52) U.S. Cl.
CPC .............. *H04L 51/22* (2013.01); *H04L 51/24* (2013.01); *H04L 67/26* (2013.01)

(58) Field of Classification Search
USPC .... 709/220, 224, 226, 228, 232; 340/539.11
See application file for complete search history.

(56) References Cited

U.S. PATENT DOCUMENTS

2015/0213134 A1* 7/2015 Nie ..................... H04L 67/2895
    707/770
2015/0312361 A1* 10/2015 Seo ......................... H04L 67/26
    370/329

FOREIGN PATENT DOCUMENTS

| CN | 103389853 A | 11/2013 |
| CN | 103795611 A | 5/2014 |

* cited by examiner

CONTROL METHOD AND APPARATUS FOR DATA DISPLAY

FIELD OF THE TECHNOLOGY

The present disclosure relates to the field of computers, and in particular, to a control method and apparatus for data display.

BACKGROUND OF THE DISCLOSURE

User generated content (UGC) is a new manner for a user to use the Internet. That is, the original manner in which downloading content required by a user from the Internet is dominated is changed to a manner in which downloading content required by a user and uploading content to be shared by a user are equally important. UGC is mainly applied in forms such as a social network, video sharing, blog, and the like. With the continuous development of global Internet services, a UGC service is rising, which arouses extensive attention of the industry.

Because data is generated by users, a large number of users that use the UGC service generate a large amount of data. Using microblog as an example, data received by a fan from an idol is displayed in a reverse chronological order of receiving time of the data. That is, displayed in a reverse chronological order from new data to old data. However, because fans gets online at different time points and different fans follow different idols, important data pushed by an idol may not be seen by a fan in time. For example, an idol S sends a piece of important data "the star S will participate in a micro interview tomorrow" at 8:00 today, a fan a of the idol S follows microblog of multiple idols, and the fan a has a long login cycle; in this case, as shown in FIG. 1, when the fan a logs in at 14:00 today, the important data pushed by the idol S may appear at the bottom of the fifth page of an interface of the fan a. Consequently, the fan cannot learn in time the important data pushed by the idol S.

To solve the foregoing problem, a solution of repeatedly sending same data is proposed, that is, one client sends same data to another client at intervals. In this way, the another client receives a large amount of repetitive data, so that a large proportion of data displayed on the another client is repetitive, and other data that is not repetitive is displayed on the client mixing with repetitive data, thereby greatly reducing the efficiency of searching on the client for other data that is not repetitive.

For the foregoing problem, at present, no effective solution is proposed yet.

SUMMARY

Embodiments of the present invention provide a control method and apparatus for data display, so as to at least solve a technical problem that because a large amount of repetitive data is received, the efficiency of searching on a client for other data that is not repetitive is greatly reduced.

According to one aspect of the embodiments of the present invention, a control method for data display is provided, applied to a terminal, the terminal including a memory, one or more processors, and program instructions stored in the memory and executed by the one or more processors, the program instructions being used to execute the method, and the method including: receiving, by a first client at current time, first target data pushed by a second client; determining, by the first client, whether the first target data pushed by the second client has been received within a first predetermined time period before the current time; and determining, by the first client at least according to the number of times that the first target data is received within the first predetermined time period and whether the first target data received within the first predetermined time period has been displayed on the first client, whether to display, on the first client, the first target data received at the current time if the first client determines that the first client has received, within the first predetermined time period, the first target data pushed by the second client.

According to another aspect of the embodiments of the present invention, a control apparatus for data display is provided, located in a first client, the first client running in a terminal, the terminal including a memory storing the control apparatus and a processor executing one or more program units in the control apparatus, and the one or more program units including: a receiving unit, configured to receive, at current time, first target data pushed by a second client; a determining unit, configured to determine whether the first target data pushed by the second client has been received within a first predetermined time period before the current time; and a display control unit, configured to: when it is determined that the first client has received, within the first predetermined time period, the first target data pushed by the second client, determine, at least according to the number of times that the first target data is received within the first predetermined time period and whether the first target data received within the first predetermined time period has been displayed on the first client, whether to display, on the first client, the first target data received at the current time.

In the embodiments of the present invention, whether to display received target data on a client is determined according to different factors, so that under a condition, repetitive received target data is not displayed or the target data is displayed only once; therefore, other data that is not repetitive is displayed on the client without mixing with repetitive data, thereby greatly improving the efficiency of searching on the client for the other data that is not repetitive.

BRIEF DESCRIPTION OF THE DRAWINGS

The accompanying drawings described herein are used to provide a further understanding of the present disclosure, and form part of the present disclosure. Exemplary embodiments of the present invention and descriptions thereof are used to explain the present disclosure, and do not constitute any inappropriate limitation to the present disclosure. In the accompanying drawings.

DESCRIPTION OF EMBODIMENTS

To make a person skilled in the art better understand the technical solutions of the present disclosure, the following clearly and completely describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

It should be noted that, in the specification, claims, and accompanying drawings of the present disclosure, the terms "first", "second", and the like are intended to distinguish between similar objects rather than indicating a specific order. It should be understood that, data used in this way is exchangeable in a proper case, so that the embodiments described herein of the present invention can be implemented in another order except those shown or described herein. Moreover, the terms "include", "contain" and any other variants mean to cover the non-exclusive inclusion. For example, a process, method, system, product, or device that includes a series of steps or units is not necessarily limited to those steps or units, but may include other steps or units not expressly listed or inherent to such a process, method, product, or device.

Figure 1:
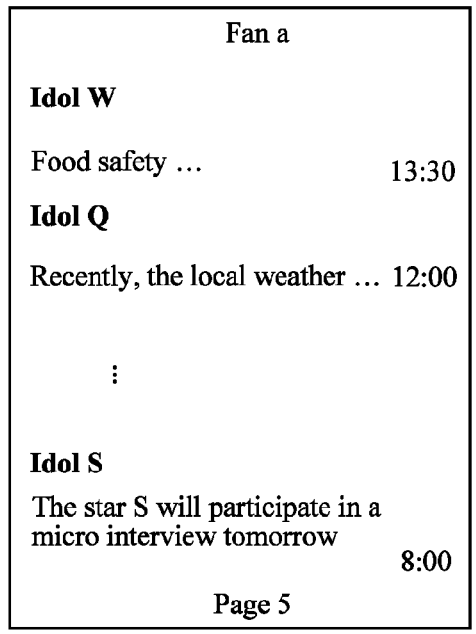
FIG. 1 is a schematic diagram of a data display according to the existing technology.
Figure 2:
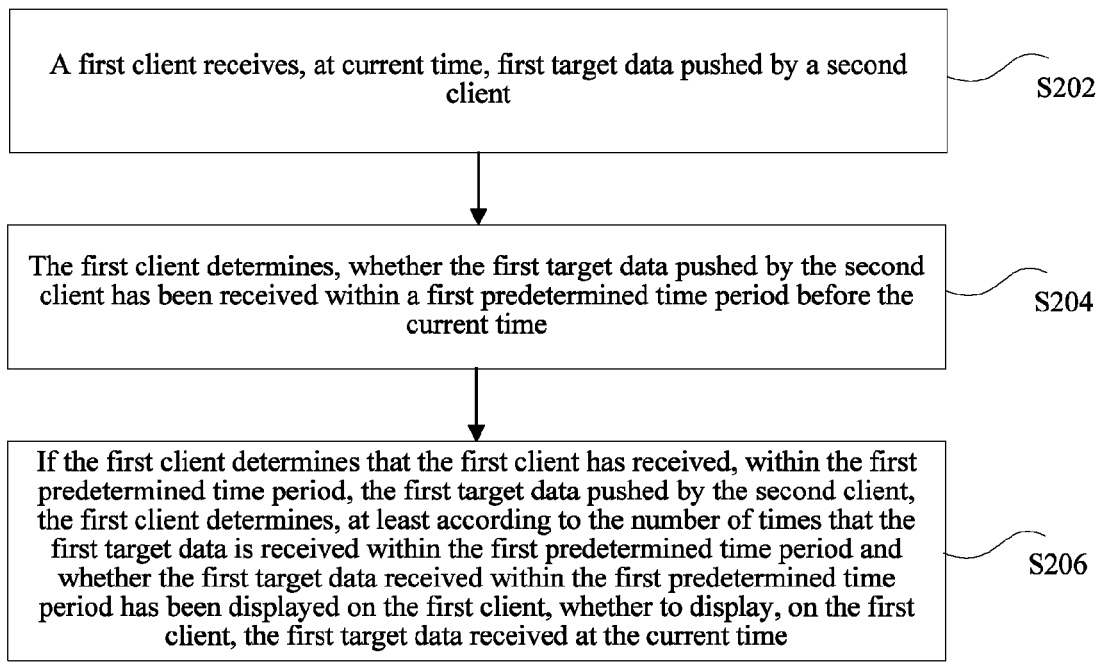
FIG. 2 is a flowchart of an optional control method for data display according to an embodiment of the present invention.

According to this embodiment of the present invention, a control method for data display is provided. As shown in FIG. 2, the method includes:

S202: A first client receives, at current time, first target data pushed by a second client.

S204: The first client determines, whether the first target data pushed by the second client has been received within a first predetermined time period before the current time.

S206: If the first client determines that the first client has received, within the first predetermined time period, the first target data pushed by the second client, the first client determines, at least according to the number of times that the first target data is received within the first predetermined time period and whether the first target data received within the first predetermined time period has been displayed on the first client, whether to display, on the first client, the first target data received at the current time.

Figure 3:
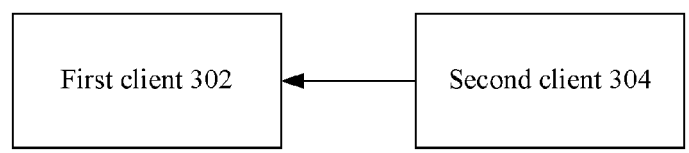
FIG. 3 is a schematic diagram of an optional control method for data display according to an embodiment of the present invention.

In this embodiment, the foregoing control method for data display may be applied to a client installed in a terminal, where the terminal may include of the following: a mobile phone and a tablet computer. In this embodiment, the client may be, but not limited to, a microblog client. For example, as shown in FIG. 3, it is assumed that a first client 302 is a microblog client with an account A, and a second client 304 is a microblog client with an account B followed by the account A logging in to the first client 302. When the second client 304 publishes a piece of microblog, the second client 304 pushes, by using a server, data of the published microblog to a microblog client (including the first client 302) following the account B. In this way, the first client 302 can receive the pushed data by using the server (for example, the pushed data includes the first target data recorded in this embodiment). The foregoing example is merely exemplary, and no limitation is set in the present disclosure.

In this embodiment, the first target data may be, but not limited to, data of which the number of times of reception within the first predetermined time period is greater than a first predetermined threshold. In this embodiment, a value of the first predetermined threshold may be preconfigured on the first client, but the present disclosure is not limited thereto, different values may be applied to, but not limited to, different scenarios, and the value of the first predetermined threshold is not limited in this embodiment.

In this embodiment, before pushing the first target data, the second client 304 may generate the first target data or receive, by using the server, the first target data pushed by another client, but the present disclosure is not limited thereto.

Figure 4:
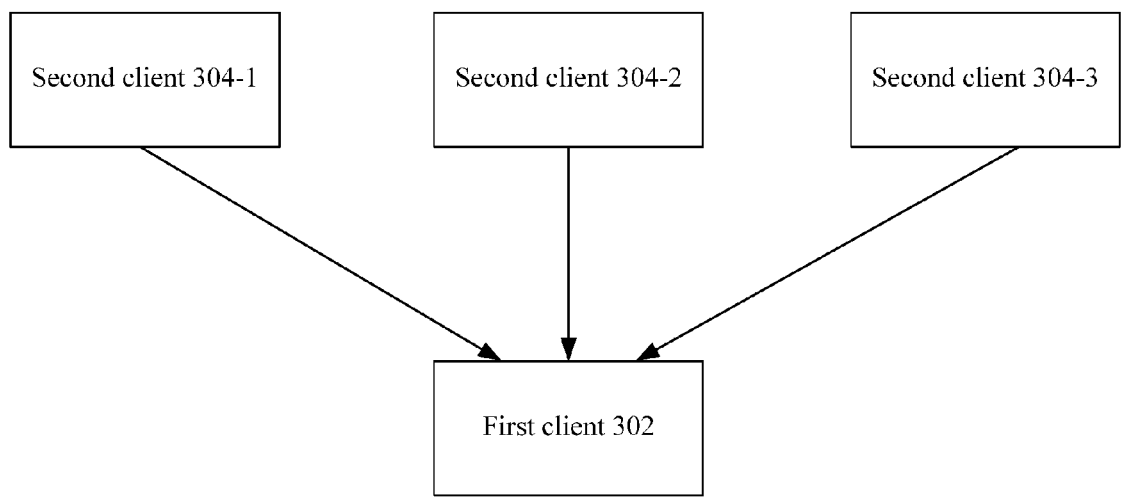
FIG. 4 is a schematic diagram of another optional control method for data display according to an embodiment of the present invention.

In this embodiment, the first target data may come from a same client or different clients. No limitation is set thereto in this embodiment. In this embodiment, second target data that has been received within a predetermined time period before the current time and is marked as repetitive received data is included, and the second target data and the first target data are both repetitive data, but have different data content, where there may be one or more pieces of second target data. For example, as shown in FIG. 4, the second client includes a second client 30431, a second client 304-2, and a second client 30433, and the clients may separately push different data to the first client 302, where the data includes the first target data and the second target data.

In this embodiment, the first predetermined time period may be, but not limited to, a time interval between two times of data update of a user. The time interval may include, but not limited to, an interval between time of two times of login of the user and an interval between time of two times of refreshing of the user. For example, on the first client 302, an account A-1 logs in at 14:00 and logs out after 5 minutes; within the 5 minutes, the account A-1 does not perform refreshing to acquire new data received within the 5 minutes, and browses only data received before the login time point; and after that, the account A-1 logs in again at 16:00 in the same day. In this case, a time interval between two times of data update of the account A-1 on the first client 302 is 2 hours. For another example, on the first client 302, an account A-2 is online for a long time after login, and the account A-2 performs refreshing at an interval of one hour. In this case, a time interval between two times of data update of the account A-2 is 1 hour.

Figure 5:
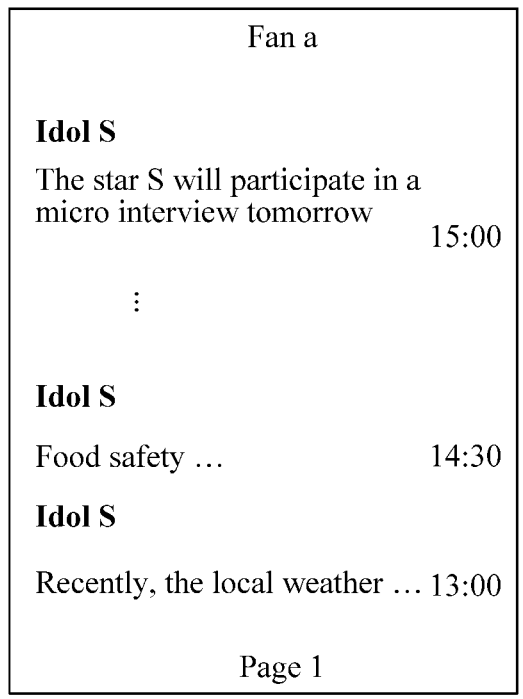
FIG. 5 is a schematic diagram of another optional control method for data display according to an embodiment of the present invention.

For example, in this example, using microblog as an example, it is assumed that the account A on the first client 302 is a fan a in microblog, the account B on the second client 304 is an idol S in microblog followed by fans, and the first predetermined time period is a time interval, for example, 2 hours, between two times of refreshing of an account, that is, the fan a, on the first client 302. Assuming that the idol S publishes a piece of first target data at 14:00 today, 4-18, for example, the first target data includes "the star S will participate in a micro interview at 19:00 tomorrow", the first target data is pushed at an interval of 1 minute to a fan selected by the idol S from a list of the idol S, where the fan includes the fan a. Further, the fan a logs in at 15:00 today and performs the first refreshing, and receives the first target data that is pushed by the idol S before 15:00, and then the fan a needs to determine whether the first target data published by the idol S has been received within 2 hours before current time, that is, 15:00. Assuming that the fan a determines that the fan a has received, before 15:00, the first target data published by the idol S, the fan a further needs to determine, according to whether the number of times that the first target data is received within the 2 hours meets a threshold and whether the first target data received within the 2 hours has been displayed on an interface of the fan a before, whether the first target data pushed by the idol S and received at the current time, that is, 15:00, can be displayed on the interface of the fan a. If the foregoing determining condition is met, the first target data of the idol S can be displayed at a front position on the interface of the fan a. As shown in FIG. 5, the first target data may be directly inserted and displayed at the moment "15:00" jumping over other data, so that the fan can acquire as soon as possible the important data pushed by the idol. Therefore, a fan does not miss important data pushed by an important idol because the fan follows an excessive large number of users or the fan does not update data for a long time.

In this embodiment, the determining condition of displaying the first target data on the first client 302 includes, but not limited to: whether the number of pieces of second target data having been displayed on the first client 302 within the first predetermined time period is less than a predetermined threshold, and whether a time interval between the first target data to be displayed at the current time and the first target data having been displayed within the first predetermined time period before the current time is greater than a predetermined threshold.

In this embodiment, it is determined whether a display parameter of the first target data displayed for the account A on the first client 302 meets the determining condition of display, where the display parameter may include, but not limited to: time of the last login of the account A on the first client 302, the number of pieces of second target data having been displayed for the account A on the first client 302, and time of the last display of the first target data for the account A on the first client 302.

For example, as shown in Table 1, using microblog as an example, it is assumed that the account A on the first client 302 is a fan in microblog, and the account B on the second client 304 is an idol in microblog followed by fans. It is assumed that an idol S selects a fan a, a fan b, a fan c, a fan d, and a fan e from a list of the idol S, to receive first target data that is pushed by the idol S at 15:00. Further, it is assumed that all the fans each time are online for two hours after login, current time is 20:00, and the fans simultaneously log in. In addition, the following assumption may be made for the determining condition of displaying the first target data: whether the number of pieces of second target data having been displayed within a predetermined time (for example, 1 day) for the account A on the first client 302 is less than a predetermined threshold, where the predetermined threshold may be 3, and whether a time interval between the first target data to be displayed at the current time and the second target data having been displayed within the predetermined time before the current time is greater than a predetermined threshold, where the threshold is assumed to be 1 hour.

TABLE 1

|  | Fan a | Fan b | Fan c | Fan d | Fan e |
| --- | --- | --- | --- | --- | --- |
| Time of the last login | 12:00 | 14:00 | 10:30 | 12:30 | 14:00 |
| The number of pieces of second target data having been displayed | 0 | 2 | 3 | 2 | 1 |
| Time of the last display of second target data |  | 15:00 | 12:30 | 12:00 | 14:30 |

As can be known from the foregoing Table 1, the fan a receives no second target data before 20:00 today, and therefore, when the fan a logs in at 20:00, the received first target data pushed by the idol Sat 15:00 can be directly displayed. The time of the last login of the fan b is 14:00, the fan b receives, at 15:00, the first target data pushed by the idol S, and it is determined that the fan b has received and displayed one piece of second target data within one day and the number of pieces of second target data having been displayed is less than the predetermined threshold 3, and therefore, the first target data published by the idol S at 15:00 can be directly displayed at 15:00. When the fan b logs in at 20:00, the first target data published by the idol Sat 15:00 has been displayed before, and therefore is not displayed. The time of the last login of the fan c is 10:30, the time of the last display of second target data is 12:30, and the fan c receives and displays a third piece of second target data at 12:30, and therefore, when the fan c logs in at 20:00 and receives the first target data that is published by the idol Sat 15:00, because the number of pieces of second target data having been displayed within a predetermined time (for example, 1 day) is greater than the predetermined threshold 3, the first target data published by the idol S at 15:00 is not displayed for the fan c. The time of the last login of the fan d is 12:30, and the fan d receives and displays one piece of second target data at 12:00, and the fan d logs out at 14:30 before the pushing time 15:00 at which the idol S publishes the first target data, that is, the fan d has not received, before the last login, the first target data that is published by the idol Sat 15:00; when the fan d logs in again at 20:00, because the number of pieces of the second target data having been displayed within a predetermined time (for example, 1 day) is 1 and is less than the predetermined threshold 3, and a time interval between the current time and the time 12:00 of the last display of the second target data is greater than the predetermined threshold 1 hour, the first target data published by the idol S at 15:00 can be displayed for the fan d, and because the first target data is repeatedly pushed by the server, the first target data is inserted at a front position on a display interface of the fan d. The time of the last login of the fan e is 14:00, but the time of the last display of second target data is 14:30; when the fan e receives, at 15:00, the first target data published by the idol S, because a time interval between the first target data to be displayed at the current time and the second target data having been displayed within the predetermined time before the current time is greater than the predetermined threshold 1 hour, and the receiving time of the first target data of the fan e and the receiving time of the last reception of the second target data are respectively 15:00 and 14:30, which are differed by only half an hour, although the fan e is online at 15:00, the first target data published by the idol S at 15:00 still cannot be displayed, until 15:30, the first target data published by the idol S at 15:00 can be displayed for the fan e, and when the fan e logs in at 20:00, because the first target data published by the idol S at 15:00 has been displayed before, the first target data is not displayed at 20:00.

In this embodiment provided by the present invention, whether first target data received by a first client meets a condition is determined, and the first target data meeting the condition is displayed on the first client, so that on the first client, whenever data is updated, the first target data published by a second client can be seen as soon as possible, so as to ensure that the first client can receive in time important data published by the second client.

As an optional solution, the determining, by the first client at least according to the number of times that the first target data is received within the first predetermined time period and whether the first target data received within the first predetermined time period has been displayed on the first client, whether to display, on the first client, the first target data received at the current time includes:

S1: If the first client determines that the number of times that the first client receives the first target data within the first predetermined time period is greater than a first predetermined threshold and the first target data received within the first predetermined time period is not displayed on the first client, for the first target data received at the current time and the first target data received within the first predetermined time period, the first client displays, on the first client, only the first target data received at the current time.

In this embodiment, the first predetermined time period may be, but not limited to, a time interval between two times of data update of a user. The time interval may include, but not limited to, an interval between time of two times of login of the user and an interval between time of two times of refreshing of the user. For example, on the first client 302, an account A-1 logs in at 14:00 and logs out after 5 minutes; within the 5 minutes, the account A-1 does not perform refreshing to acquire new data received within the 5 minutes, and browses only data received before the login time point; and after that, the account A-1 logs in again at 16:00 in the same day. In this case, a time interval between two times of data update of the account A-1 on the first client 302 is 2 hours. For another example, on the first client 302, an account A-2 is online for a long time after login, and the account A-2 performs refreshing at an interval of one hour. In this case, a time interval between two times of data update of the account A-2 is 1 hour. In this embodiment, the first predetermined threshold is used to determine and distinguish that the first target data received by the first client 302 is different from other data received by the first client 302.

For example, it is assumed that the first predetermined threshold is 10, the number of times that the account A on the first client 302 receives the first target data within the first predetermined time period (for example, the first predetermined time period is 2 hours) is 120 (that is, receives the first target data every minute), that is, the number of times that the first target data is received is greater than the first predetermined threshold 10, and it is further determined that the first target data received within the first predetermined time period (for example, the first predetermined time period is 2 hours) is not displayed on the first client 302. Then, for the first target data received at the current time (for example, the current time is 20:00) and the repetitive first target data received within the first predetermined time period (for example, the first predetermined time period is 2 hours), the first client 302 displays only the first target data received at the current time (for example, the current time is 20:00) and pushed by the server.

Description is provided below by using a specific example. In this example, using microblog as an example, it is assumed that the account A on the first client 302 is a fan in microblog, and the account B on the second client 304 is an idol in microblog followed by fans. Assuming that an idol S publishes a piece of first target data at 15:00 today (for example, 4-18), for example, the first target data includes "the star S will participate in a micro interview at 19:00 tomorrow", and the idol S selects a fan a and a fan b to receive the first target data, the server pushes the first target data to the fan a and the fan b at an interval of 1 minute. The fan a happens to be online at 15:00, and after it is determined that the foregoing display control condition is met, the first target data is directly displayed on an interface of the fan a, and the display time is "15:00". The fan b does not update data until 12:00 in the next day (that is, the date 4-19). During the time from 15:00 today, 4-18, to 12:00 in the next day 4-19, because the first target data published by the idol S at 15:00 is not displayed for the fan b, the fan b receives, at an interval of 1 minute, new first target data pushed by the server, and the new first target data replaces the previously received first target data, so that receiving time of the first target data is always kept to be the latest. After the fan b updates data, the first target data participates in the data update with the receiving time of the latest received first target data, so that it is ensured that the first target data can be displayed at a front position on an interface. For example, in this example, the display time of the first target data is "12:00" in the next day 4-19 rather than the time, that is, "15:00" on 4-18, at which the idol S publishes the first target data.

In this embodiment provided by the present invention, the number of times that first target data is received exceeds a predetermined threshold, so that important data pushed by a second client can always be displayed on a most front end, and whenever a user of the first client logs in, the important data published by the second client can be seen as soon as possible, without missing an important message.

As an optional solution, the determining, by the first client at least according to the number of times that the first target data is received within the first predetermined time period and whether the first target data received within the first predetermined time period has been displayed on the first client, whether to display, on the first client, the first target data received at the current time includes:

S1: If the first client determines that the number of times that the first client receives the first target data within the first predetermined time period is greater than a first predetermined threshold and the first target data received within the first predetermined time period has been displayed on the first client, the first client skips displaying, on the first client, the first target data received at the current time.

In this embodiment, at least one of the following manners may be used to stop subsequent pushing, to the first client 302, of the first target data published by the second client 304: The first client 302 has displayed the first target data on the interface. The time in which the first client 302 does not display the first target data is greater than a predetermined threshold. For example, when for the account B on the second client 304, it is leaned after determining is performed on the received first target data that, the first target data has been displayed on the interface for the account A on the first client 302 during the last data update (for example, 12:00), the first target data received at the current time (for example, 20:00) is displayed on the first client 302. For another example, when the first target data published by the account B on the second client 304 has been repeatedly pushed for a week, and the first client 302 does not display the first target data, the first target data stops subsequent pushing.

In this embodiment, when the condition that the first target data received within the first predetermined time period has been displayed on the first client 302 is met, the account A on the first client 302 sends, to the account B on the second client 304, a response for stopping subsequent pushing of the first target data.

For example, it is assumed that the first predetermined threshold is 10, the number of times that the account A on the first client 302 receives the first target data within the first predetermined time period (for example, the first predetermined time period is 2 hours) is 120 (that is, receives the first target data every minute), that is, the number of times that the first target data is received is greater than the first predetermined threshold 10, and it is further determined that the first target data received within the first predetermined time period (for example, the first predetermined time period is 2 hours) has been displayed on the first client 302. Then, the first target data received at the current time (for example, the current time is 20:00) is not displayed on the first client 302.

Description is provided below by using a specific example. In this example, using microblog as an example, it is assumed that the account A on the first client 302 is a fan in microblog, and the account B on the second client 304 is an idol in microblog followed by fans. Assuming that an idol S publishes a piece of first target data at 15:00 today (for example, 4-18), for example, the first target data includes "the star S will participate in a micro interview at 19:00 tomorrow", and the idol S selects a fan c to receive the first target data, the server pushes the first target data to the fan c at an interval of 1 minute. The fan c performs update at 18:00 today (for example, 4-18), and receives the first target data, and it is learned by determining that, the first target data has been displayed during the last update before the last logout of the fan c (for example, the logout time is 15:00), and therefore, although the first target data is received at current time 18:00, the first target data is not displayed on an interface of the fan c.

For another example, with reference to the foregoing scenario, a fan d also receives the first target data that is published by the idol S at 15:00 today (for example, 4-18), for example, the first target data includes "the star S will participate in a micro interview at 19:00 tomorrow". However, the fan d does not update data until 20:00 on 4-27 in the next week. Because no refreshing and display are performed for a long time, and a predetermined threshold (for example, a week) is exceeded, display time of the first target data received by the fan d is not 20:00 on 4-27, and only the last moment in a week counted from the publishing time can be retained, that is, 15:00 on 4-25, and the fan d also sends, to the idol S, a response for stopping subsequent pushing of the first target data.

In this embodiment provided by the present invention, it is determined whether first target data received by a first client has been displayed, so that the first client can reduce the disturbance of repeatedly receiving same data.

As an optional solution, the determining, by the first client at least according to the number of times that the first target data is received within the first predetermined time period and whether the first target data received within the first predetermined time period has been displayed on the first client, whether to display, on the first client, the first target data received at the current time includes:

S1: The first client determines, at least according to the number of times that the first target data is received within the first predetermined time period, whether the first target data received within the first predetermined time period has been displayed on the first client, and the number of pieces of second target data marked as repetitive received data and having been received within a second predetermined time period before the current time, whether to display, on the first client, the first target data received at the current time, where the number of times that each piece of the second target data marked as repetitive received data is repetitive received by the first client within a third predetermined time period before the current time is greater than a second predetermined threshold.

In this embodiment, the first target data may come from a same client or different clients, which is not limited in this embodiment. In this embodiment, the second target data and the first target data are both repetitive data, but have different data content. In this embodiment, there may be one or more pieces of second target data, but the present disclosure is not limited thereto.

In this embodiment, the second predetermined threshold is used to determine and distinguish that the second target data received by the first client 302 is different from other data received by the first client 302. In this embodiment, a value of the second predetermined threshold may be preconfigured on the first client, but the present disclosure is not limited thereto, different values may be applied to, but not limited to, different scenarios, and the value of the second predetermined threshold is not limited in this embodiment.

In this embodiment, the third predetermined time period may be, but not limited to, a time period before the last logout.

Description is provided below by using an example. For example, it is assumed that the second predetermined threshold is 10, and the number of times that the account A on the first client 302 receives the second target data within the third predetermined time period is 120 (that is, receives the second target data every minute), that is, the number of times that the second target data is received is greater than the second predetermined threshold 10.

In this embodiment, the second predetermined time period may be used to, but not limited to being used to, determine whether the number of pieces of second target data having been displayed within the time period is excessive large, to determine whether the account A on first client 302 is affected. In this embodiment, a value of the second predetermined time period may be preconfigured on the first client 302, but the present disclosure is not limited thereto, different values may be applied to, but not limited to, different scenarios, and the value of the second predetermined time period is not limited in this embodiment. In the foregoing manner, disturbance to the first client 302 can be reduced.

For example, the account A on the first client 302 logs in and performs update at 20:00 today (for example, 4-18), and before that, the account A on the first client 302 once logs in at 12:00 today (for example, 4-18), and keeps online until logout at 15:00. The time period from 15:00 to 20:00 is the first predetermined time period recorded in the foregoing solution, a time period before 15:00 may be set as the third predetermined time period, and the second predetermined time period may be 1 day before current time 20:00, that is, 24 hours before 20:00.

Specific description is provided below with reference to the example shown in Table 2, where Table 2 shows different publishing time of different data published by the account B (for example, the idol S) on the second client 304, login time of the account A (for example, the fan a) on the first client 302, receiving time of first target data and second target data, and display time of displaying the first target data and the second target data.

TABLE 2

| | First client 302 (fan a) | | Second client 304 (idol S) |
|---|---|---|---|
| Time | Received data | Displayed data | Published data |
| 14-4-17 10:00 | "The star S will participate in a micro interview tomorrow" | | "The star S will participate in a micro interview tomorrow" |

TABLE 2-continued

| Time | First client 302 (fan a) | | Second client 304 (idol S) |
| --- | --- | --- | --- |
| | Received data | Displayed data | Published data |
| 14-4-18 12:00 (login time) | "The star S will participate in a micro interview tomorrow" | "The star S will participate in a micro interview tomorrow" | |
| 14-4-18 15:00 (logout) | | | |
| 14-4-18 16:00 | "The temperature will drop by 10° C. tomorrow" | | "The temperature will drop by 10° C. tomorrow" |
| 14-4-18 18:00 | "The temperature will drop by 10° C. tomorrow" "So happy today" | | "So happy today" |
| 14-4-18 20:00 (login time) | "The temperature will drop by 10° C. tomorrow" | "The temperature will drop by 10° C. tomorrow" "So happy today" | |

As shown in Table 2, in this example, using microblog as an example, it is assumed that the account A on the first client 302 is a fan a in microblog, and the account B on the second client 304 is an idol S in microblog followed by fans, and it is assumed that the first predetermined threshold and the second predetermined threshold are both 10. It is assumed that the idol S publishes the following data to a fan (for example, the fan a) in a list of the idol S: data published at 10:00 on 4-17 is: "the star S will participate in a micro interview tomorrow"; data published at 16:00 on 4-18 is: "the temperature will drop by 10° C. tomorrow"; and data published at 18:00 on 4-18 is: "so happy today". The number of times that the first piece of data published at 10:00 is received is greater than the predetermined threshold 10, and the number of times that the second piece of data published at 16:00 is received is also greater than the predetermined threshold 10, but the number of times that the third piece of data published at 18:00 is received is only 2, that is, less than the predetermined threshold 10; therefore, only the first piece of data and the second piece of data are marked as repetitive received data. Within the two days, the fan a does not log in until 12:00 on 4-18, and logs out at 15:00, and logs in again at 20:00 on 4-18. Then, the first predetermined time period is from 15:00 to 20:00, 5 hours in total, the third predetermined time period is a time period before 15:00, and the second predetermined time period may be set to 1 day. Within the second predetermined time period, the number of pieces of data that are marked as repetitive received data and can be displayed by the first client 302 is less than a predetermined threshold, where the predetermined threshold may be set to 3 in this example.

Based on the foregoing description, the data repeatedly received by the fan a separately are: 1) the first target data "the temperature will drop by 10° C. tomorrow" published by the idol S at 16:00 and 2) the second target data "the star S will participate in a micro interview tomorrow" published by the idol S at 10:00. When the fan a logs in at 12:00 on 4-18, and receives one piece of repetitive data, that is, the second target data "the star S will participate in a micro interview tomorrow" published by the idol S at 10:00 on 4-17, which is the first piece of repetitive data received by the fan a in the same day, the server repeatedly pushes the second target data to the fan a at an interval of 1 minute, so that receiving time of the second target data received by the fan a is always the latest, and the second target data is displayed at 12:00 on 4-18 on an interface of the fan a with receiving time being a time point "12:00". After that, when the fan a logs in again at 20:00 on 4-18, the fan a receives again the first target data "the temperature will drop by 10° C. tomorrow" that is published by the idol S at 16:00 on 4-18 and the data "so happy today" that is published by the idol S at 18:00 on 4-18. Whether to display the first target data needs to be further determined by determining whether the number of pieces of second target data having been received within the second predetermined time period (for example, 1 day) before the current time 20:00 and marked as repetitive received data meets a predetermined condition.

Figure 6:
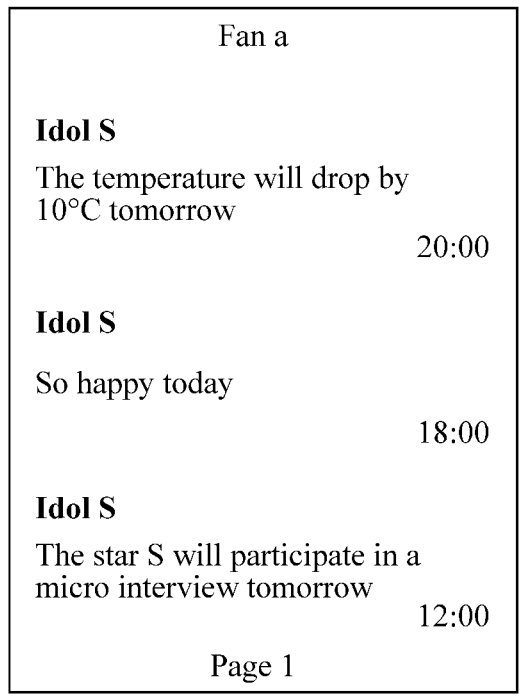
FIG. 6 is a schematic diagram of another optional control method for data display according to an embodiment of the present invention.

Further, in this example, because the number 1 of pieces of target data having been displayed before within the second predetermined time period (for example, 1 day) is less than a predetermined threshold (for example, the predetermined threshold is 3), the first target data, that is, "the temperature will drop by 10° C. tomorrow" can be displayed on the interface of the fan a, and because the data is continuously repeatedly received, receiving time of the first target data is always the latest, so that in this example, although the first target data is published at 16:00 on 4-18, the publishing time point is later than the publishing time 18:00 on 4-18 of the third piece of data (that is, "so happy today"), because the repeated pushing of the first target data updates the receiving time of the first target data, the first target data can be displayed on the interface of the fan a before the ordinary third piece of data. As shown in FIG. 6, the first target data is displayed with receiving time being "20:00" on 4-18, and the ordinary third piece of data is displayed with receiving time being "18:00" on 4-18.

In this embodiment provided by this application, it is determined whether the number of pieces of second target data within a third predetermined time period meets a condition of a third predetermined threshold, to determine whether to display first target data, so that a first client can reduce disturbance from repetitive data.

As an optional solution, the determining, by the first client at least according to the number of times that the first target data is received within the first predetermined time period, whether the first target data received within the first predetermined time period has been displayed on the first client, and the number of pieces of second target data marked as repetitive received data and having been received within a second predetermined time period before the current time, whether to display, on the first client, the first target data received at the current time includes:

S1: If the first client determines that the number of times that the first client receives the first target data within the first predetermined time period is greater than a first predetermined threshold, the first target data received within the first predetermined time period is not displayed on the first client, and the number of pieces of second target data marked as repetitive received data and having been received within the second predetermined time period before the current time is less than or equal to a third predetermined threshold, for the first target data received at the current time and the first target data received within the first predetermined time period, the first client displays, on the first client, only the first target data received at the current time.

S2: If the first client determines that the number of times that the first client receives the first target data within the first predetermined time period is greater than a first predetermined threshold, the first target data received within the first predetermined time period is not displayed on the first client, and the number of pieces of second target data marked as repetitive received data and having been received within the second predetermined time period before the current time is greater than the third predetermined threshold, the first client skips displaying, on the first client, the first target data received at the current time and the first target data received within the first predetermined time period.

In this embodiment, the third predetermined threshold is used to determine whether the number of pieces of target data displayed on the first client within the second predetermined time period is excessively large, to perform control to reduce disturbance to the first client.

For example, as shown in Table 1, using microblog as an example, it is assumed that the account A on the first client 302 is a fan in microblog, and the account B on the second client 304 is an idol in microblog followed by fans. It is assumed that an idol S selects a fan a, a fan b, a fan c, a fan d, and a fan e from a list of the idol S, to receive first target data that is published by the idol S at 15:00. Further, it is assumed that all the fans each time are online for two hours after login, current time is 20:00, and the fans simultaneously log in. In addition, the following assumption may be made for the determining condition of displaying the first target data: whether the number of pieces of second target data having been displayed within a predetermined time (for example, 1 day) for the account A on the first client 302 is less than a third predetermined threshold, and herein, the third predetermined threshold is assumed to be 3.

Description is specifically provided by using the fan b and the fan c in Table 1. The time of the last login of the fan b is 14:00, and the fan b receives, at 15:00, the target data published by the idol S, and it is determined that the fan b has received and displayed one piece of second target data within one day, that is, the number of pieces of second target data that have been received and are marked as repetitive received data is 1, and the number of pieces of second target data having been displayed is less than the predetermined threshold 3; therefore, the first target data published by the idol S at 15:00 can be directly displayed at 15:00, and when the fan b logs in at 20:00, the first target data published by the idol S at 15:00 is not displayed because it has been displayed before. The time of the last login of the fan c is 10:30, the time of the last display of second target data is 12:30, and the fan c receives and displays, at 12:30, a third piece of second target data; therefore, when the fan c logs in at 20:00 and receives the first target data that is published by the idol S at 15:00, because the number of pieces of second target data having been displayed within a predetermined time (for example, 1 day) has been greater than the predetermined threshold 3, the first target data published by the idol S at 15:00 is not displayed for the fan c.

In this embodiment provided by the present invention, a determining condition is set for the number of pieces of second target data having been displayed on the first client, to achieve proper control on the number of pieces of displayed repetitive data, so that not only a user can acquire as soon as possible first target data received at current time, but also no disturbance is caused to the user.

As an optional solution, the determining, by the first client at least according to the number of times that the first target data is received within the first predetermined time period, whether the first target data received within the first predetermined time period has been displayed on the first client, and the number of pieces of second target data marked as repetitive received data and having been received within a second predetermined time period before the current time, whether to display, on the first client, the first target data received at the current time includes:

S1: If the first client determines that the number of times that the first client receives the first target data within the first predetermined time period is greater than a first predetermined threshold, the first target data received within the first predetermined time period is not displayed on the first client, and the number of pieces of second target data marked as repetitive received data and having been received within the second predetermined time period before the current time is less than or equal to a third predetermined threshold, the first client determines whether a time interval between the current time and receiving time of the last received piece of second target data is greater than a fourth predetermined threshold.

S2: If the time interval is greater than the fourth predetermined threshold, for the first target data received at the current time and the first target data received within the first predetermined time period, the first client displays, on the first client, only the first target data received at the current time S3: If the time interval is less than or equal to the fourth predetermined threshold, the first client skips displaying, on the first client, the first target data received at the current time and the first target data received within the first predetermined time period.

In this embodiment, the fourth predetermined threshold is used to determine whether a time interval between each two pieces of target data is excessively short, to control a time interval between target data displayed on the first client. In this embodiment, a value of the fourth predetermined threshold may be preconfigured on the first client, but the present disclosure is not limited thereto, different values may be applied to, but not limited to, different scenarios, and the value of the fourth predetermined threshold is not limited in this embodiment.

For example, after the account A on the first client 302 determines that the first target data meets the condition that the number of times of reception is greater than the first predetermined threshold, and further determines that the first target data has not been displayed, and the number of pieces of second target data received within the second predetermined time period before the current time also meets the condition of being less than or equal to the third predetermined threshold, it is further required to determine whether the time interval between the current time and receiving time of the last received piece of second target data is greater than the fourth predetermined threshold. For example, assuming that the fourth threshold is 1 hour, the first target data can be displayed on the first client 302 only when the time interval between the current time and the receiving time of the last received piece of second target data is greater than 1 hour.

Description is specifically provided by using the fan d and the fan e in Table 1. The time of the last login of the fan d is 12:30, and the fan d receives and displays one piece of second target data at 12:00, and the fan d logs out at 14:30 before the pushing time 15:00 at which the idol S publishes the first target data, that is, the fan d has not received, before the last login, the first target data that is published by the idol S at 15:00; when the fan d logs in again at 20:00, because the number of pieces of the second target data having been displayed within a predetermined time (for example, 1 day) is 1 and is less than the predetermined threshold 3, and a time interval between the current time and the time 12:00 of the last display of the second target data is greater than the predetermined threshold 1 hour, the first target data published by the idol S at 15:00 can be displayed for the fan d, and because the first target data is repeatedly pushed by the server, the first target data is inserted at a front position on a display interface of the fan d. The time of the last login of the fan e is 14:00, but the time of the last display of second target data is 14:30; when the fan e receives, at 15:00, the first target data published by the idol S, because a time interval between the first target data to be displayed at the current time and the second target data having been displayed within the predetermined time before the current time is greater than the predetermined threshold 1 hour, and the receiving time of the first target data of the fan e and the receiving time of the last reception of the second target data are respectively 15:00 and 14:30, which are differed by only half an hour, although the fan e is online at 15:00, the first target data published by the idol S at 15:00 still cannot be displayed, until 15:30, the first target data published by the idol S at 15:00 can be displayed for the fan e, and when the fan e logs in at 20:00, because the first target data published by the idol S at 15:00 has been displayed before, the first target data is not displayed at 20:00.

Figure 7:
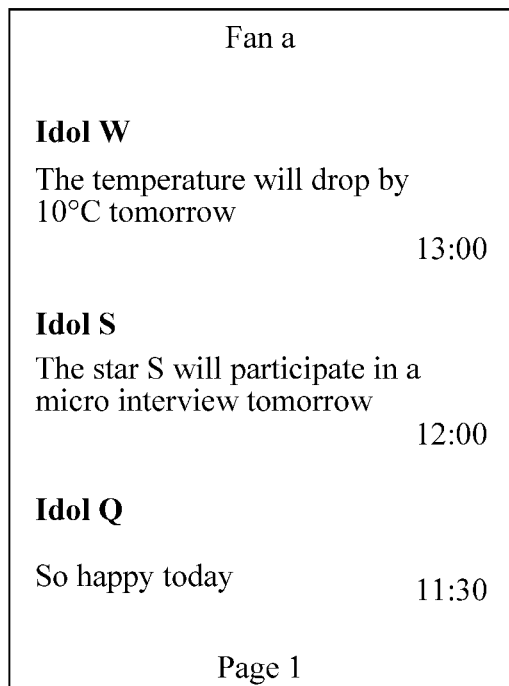
FIG. 7 is a schematic diagram of another optional control method for data display according to an embodiment of the present invention.

In this embodiment, there may be one or more second clients 304, but the present disclosure is not limited thereto. For example, as shown in FIG. 4, the second client 304 includes a second client 304-1, a second client 304-2, and a second client 304-3, and the clients may separately push different target data to the first client 302. It is assumed that the second client 304-1, the second client 304-2, and the second client 304-3 respectively are an idol S, an idol W, and an idol Q, all the idols have a same fan a, the idol S publishes a piece of data "the star S will participate in a micro interview tomorrow" at 9:00 today, 4-18, the idol W publishes a piece of data "the temperature will drop by 10° C. tomorrow" at 11:00 today, 4-18, and the idol Q publishes a piece of data "so happy today" at 11:30 today, 4-18, where the data published by the idol S and the idol W is marked as repetitive received data. The time of the last login of the fan a is 22:00 yesterday, 4-17, and the fan a logs in again at 12:00 today; assuming that the fan a receives only the three pieces of data within a time period between the two times of login, the data is displayed in sequence, as shown in FIG. 7.

In this embodiment provided by this application, an interval between display time of each two pieces of repetitive received data is limited, to achieve proper control on display of target data.

It should be noted that, for brevity of description, the foregoing method embodiments are described as a combination of a series of actions. However, persons skilled in the art should be aware that the present disclosure is not limited to the order of the described actions, because some steps may be performed in another order or be performed simultaneously according to the present disclosure. In addition, persons skilled in the art should also be aware that, the embodiments described in the specification are preferred embodiments, and the involved actions and modules are not necessarily required by the present disclosure.

Through the foregoing description of the implementation manners, it is clear to persons skilled in the art that the present disclosure may be implemented by software plus a necessary universal hardware platform, and certainly may also be implemented by hardware, but in many cases, the software implementation is preferred. Based on such an understanding, the technical solutions of the present disclosure essentially, or the part contributing to the existing technology may be implemented in a form of a software product. The computer software product is stored in a storage medium (for example, a (read-only memory) ROM/ (random access memory) RAM, a magnetic disk, or an optical disc), and includes several instructions for instructing a computer device (which may be a mobile phone, a computer, a server, a network device, or the like) to perform the methods described in the embodiments of the present invention.

Figure 8:
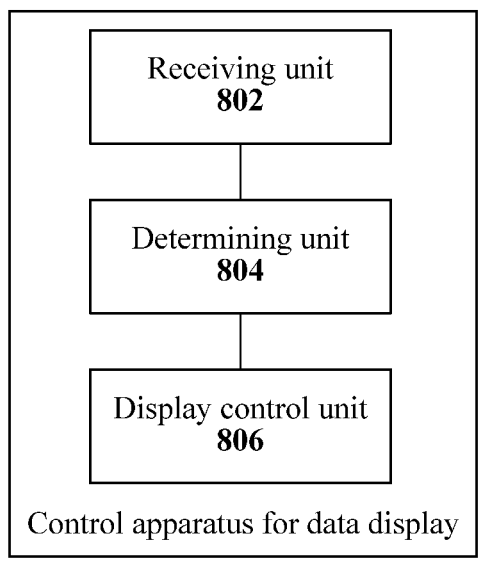
FIG. 8 is a schematic diagram of an optional control apparatus for data display according to an embodiment of the present invention.

According to this embodiment of the present invention, a control apparatus for data display configured to implement the foregoing method is further provided. As shown in FIG. 8, the apparatus in this embodiment includes:

(1) a receiving unit 802, configured to receive, at current time, first target data pushed by a second client;

(2) a determining unit 804, configured to determine whether the first target data pushed by the second client has been received within a first predetermined time period before the current time; and (3) a display control unit 806, configured to: when it is determined that the first client has received, within the first predetermined time period, the first target data pushed by the second client, determine, at least according to the number of times that the first target data is received within the first predetermined time period and whether the first target data received within the first predetermined time period has been displayed on the first client, whether to display, on the first client, the first target data received at the current time.

In this embodiment, the foregoing control apparatus for data display may be applied to a client installed in a terminal, where the terminal may include of the following: a mobile phone and a tablet computer. In this embodiment, the client may be, but not limited to, a microblog client. For example, as shown in FIG. 3, it is assumed that a first client 302 is a microblog client with an account A, and a second client 304 is a microblog client with an account B followed by the account A logging in to the first client 302. When the second client 304 publishes a piece of microblog, the second client 304 pushes, by using a server, data of the published microblog to a microblog client (including the first client 302) following the account B. In this way, the first client 302 can receive the pushed data by using the server (for example, the pushed data includes the first target data recorded in this embodiment). The foregoing example is merely exemplary, and no limitation is set in the present disclosure.

In this embodiment, the first target data may be, but not limited to, data of which the number of times of reception within the first predetermined time period is greater than a first predetermined threshold. In this embodiment, a value of the first predetermined threshold may be preconfigured on the first client, but the present disclosure is not limited thereto, different values may be applied to, but not limited to, different scenarios, and the value of the first predetermined threshold is not limited in this embodiment.

In this embodiment, before pushing the first target data, the second client 304 may generate the first target data or receive, by using the server, the first target data pushed by another client, but the present disclosure is not limited thereto.

In this embodiment, the first target data may come from a same client or different clients. No limitation is set thereto in this embodiment. In this embodiment, second target data that has been received within a predetermined time period before the current time and is marked as repetitive received data is included, and the second target data and the first target data are both repetitive data, but have different data content, where there may be one or more pieces of second target data. For example, as shown in FIG. 4, the second client includes a second client 304-1, a second client 304-2, and a second client 304-3, and the clients may separately push different data to the first client 302, where the data includes the first target data and the second target data.

In this embodiment, the first predetermined time period may be, but not limited to, a time interval between two times of data update of a user. The time interval may include, but not limited to, an interval between time of two times of login of the user and an interval between time of two times of refreshing of the user. For example, on the first client 302, an account A-1 logs in at 14:00 and logs out after 5 minutes; within the 5 minutes, the account A-1 does not perform refreshing to acquire new data received within the 5 minutes, and browses only data received before the login time point; and after that, the account A-1 logs in again at 16:00 in the same day. In this case, a time interval between two times of data update of the account A-1 on the first client 302 is 2 hours. For another example, on the first client 302, an account A-2 is online for a long time after login, and the account A-2 performs refreshing at an interval of one hour. In this case, a time interval between two times of data update of the account A-2 is 1 hour.

For example, in this example, using microblog as an example, it is assumed that the account A on the first client 302 is a fan a in microblog, the account B on the second client 304 is an idol S in microblog followed by fans, and the first predetermined time period is a time interval, for example, 2 hours, between two times of refreshing of an account, that is, the fan a, on the first client 302. Assuming that the idol S publishes a piece of first target data at 14:00 today, 4-18, for example, the first target data includes "the star S will participate in a micro interview at 19:00 tomorrow", the first target data is pushed at an interval of 1 minute to a fan selected by the idol S from a list of the idol S, where the fan includes the fan a. Further, the fan a logs in at 15:00 today and performs the first refreshing, and receives the first target data that is pushed by the idol S before 15:00, and then the fan a needs to determine whether the first target data published by the idol S has been received within 2 hours before current time, that is, 15:00. Assuming that the fan a determines that the fan a has received, before 15:00, the first target data published by the idol S, the fan a further needs to determine, according to whether the number of times that the first target data is received within the 2 hours meets a threshold and whether the first target data received within the 2 hours has been displayed on an interface of the fan a before, whether the first target data pushed by the idol S and received at the current time, that is, 15:00, can be displayed on the interface of the fan a. If the foregoing determining condition is met, the first target data of the idol S can be displayed at a front position on the interface of the fan a. As shown in FIG. 5, the first target data may be directly inserted and displayed at the moment "15:00" jumping over other data, so that the fan can acquire as soon as possible the important data pushed by the idol. Therefore, a fan does not miss important data pushed by an important idol because the fan follows an excessive large number of users or the fan does not update data for a long time.

In this embodiment, the determining condition of displaying the first target data on the first client 302 includes, but not limited to: whether the number of pieces of second target data having been displayed on the first client 302 within the first predetermined time period is less than a predetermined threshold, and whether a time interval between the first target data to be displayed at the current time and the first target data having been displayed within the first predetermined time period before the current time is greater than a predetermined threshold.

In this embodiment, it is determined whether a display parameter of the first target data displayed for the account A on the first client 302 meets the determining condition of display, where the display parameter may include, but not limited to: time of the last login of the account A on the first client 302, the number of pieces of second target data having been displayed for the account A on the first client 302, and time of the last display of the first target data for the account A on the first client 302.

For example, as shown in Table 3, using microblog as an example, it is assumed that the account A on the first client 302 is a fan in microblog, and the account B on the second client 304 is an idol in microblog followed by fans. It is assumed that an idol S selects a fan a, a fan b, a fan c, a fan d, and a fan e from a list of the idol S, to receive first target data that is pushed by the idol S at 15:00. Further, it is assumed that all the fans each time are online for two hours after login, current time is 20:00, and the fans simultaneously log in. In addition, the following assumption may be made for the determining condition of displaying the first target data: whether the number of pieces of second target data having been displayed within a predetermined time (for example, 1 day) for the account A on the first client 302 is less than a predetermined threshold, where the predetermined threshold may be 3, and whether a time interval between the first target data to be displayed at the current time and the second target data having been displayed within the predetermined time before the current time is greater than a predetermined threshold, where the threshold is assumed to be 1 hour.

TABLE 3

|  | Fan a | Fan b | Fan c | Fan d | Fan e |
| --- | --- | --- | --- | --- | --- |
| Time of the last login | 12:00 | 14:00 | 10:30 | 12:30 | 14:00 |
| The number of pieces of second target data having been displayed | 0 | 2 | 3 | 2 | 1 |
| Time of the last display of second target data |  | 15:00 | 12:30 | 12:00 | 14:30 |

As can be known from the foregoing Table 3, the fan a receives no second target data before 20:00 today, and therefore, when the fan a logs in at 20:00, the received first target data pushed by the idol S at 15:00 can be directly displayed. The time of the last login of the fan b is 14:00, the fan b receives, at 15:00, the first target data pushed by the idol S, and it is determined that the fan b has received and displayed one piece of second target data within one day and the number of pieces of second target data having been displayed is less than the predetermined threshold 3, and therefore, the first target data published by the idol S at 15:00 can be directly displayed at 15:00. When the fan b logs in at 20:00, the first target data published by the idol S at 15:00 has been displayed before, and therefore is not displayed. The time of the last login of the fan c is 10:30, the time of the last display of second target data is 12:30, and the fan c receives and displays a third piece of second target data at 12:30, and therefore, when the fan c logs in at 20:00 and receives the first target data that is published by the idol S at 15:00, because the number of pieces of second target data having been displayed within a predetermined time (for example, 1 day) is greater than the predetermined threshold 3, the first target data published by the idol S at 15:00 is not displayed for the fan c. The time of the last login of the fan d is 12:30, and the fan d receives and displays one piece of second target data at 12:00, and the fan d logs out at 14:30 before the pushing time 15:00 at which the idol S publishes the first target data, that is, the fan d has not received, before the last login, the first target data that is published by the idol S at 15:00; when the fan d logs in again at 20:00, because the number of pieces of the second target data having been displayed within a predetermined time (for example, 1 day) is 1 and is less than the predetermined threshold 3, and a time interval between the current time and the time 12:00 of the last display of the second target data is greater than the predetermined threshold 1 hour, the first target data published by the idol S at 15:00 can be displayed for the fan d, and because the first target data is repeatedly pushed by the server, the first target data is inserted at a front position on a display interface of the fan d. The time of the last login of the fan e is 14:00, but the time of the last display of second target data is 14:30; when the fan e receives, at 15:00, the first target data published by the idol S, because a time interval between the first target data to be displayed at the current time and the second target data having been displayed within the predetermined time before the current time is greater than the predetermined threshold 1 hour, and the receiving time of the first target data of the fan e and the receiving time of the last reception of the second target data are respectively 15:00 and 14:30, which are differed by only half an hour, although the fan e is online at 15:00, the first target data published by the idol S at 15:00 still cannot be displayed, until 15:30, the first target data published by the idol S at 15:00 can be displayed for the fan e, and when the fan e logs in at 20:00, because the first target data published by the idol S at 15:00 has been displayed before, the first target data is not displayed at 20:00.

In this embodiment provided by the present invention, whether first target data received by a first client meets a condition is determined, and the first target data meeting the condition is displayed on the first client, so that on the first client, whenever data is updated, the first target data published by a second client can be seen as soon as possible, so as to ensure that the first client can receive in time important data published by the second client.

As an optional solution, the display control unit 806 includes:

(1) a first control module, configured to: when it is determined that the number of times that the first target data is received within the first predetermined time period is greater than a first predetermined threshold and the first target data received within the first predetermined time period is not displayed on the first client, for the first target data received at the current time and the first target data received within the first predetermined time period, display, on the first client, only the first target data received at the current time.

In this embodiment, the first predetermined time period may be, but not limited to, a time interval between two times of data update of a user. The time interval may include, but not limited to, an interval between time of two times of login of the user and an interval between time of two times of refreshing of the user. For example, on the first client 302, an account A-1 logs in at 14:00 and logs out after 5 minutes; within the 5 minutes, the account A-1 does not perform refreshing to acquire new data received within the 5 minutes, and browses only data received before the login time point; and after that, the account A-1 logs in again at 16:00 in the same day. In this case, a time interval between two times of data update of the account A-1 on the first client 302 is 2 hours. For another example, on the first client 302, an account A-2 is online for a long time after login, and the account A-2 performs refreshing at an interval of one hour. In this case, a time interval between two times of data update of the account A-2 is 1 hour. In this embodiment, the first predetermined threshold is used to determine and distinguish that the first target data received by the first client 302 is different from other data received by the first client 302.

For example, it is assumed that the first predetermined threshold is 10, the number of times that the account A on the first client 302 receives the first target data within the first predetermined time period (for example, the first predetermined time period is 2 hours) is 120 (that is, receives the first target data every minute), that is, the number of times that the first target data is received is greater than the first predetermined threshold 10, and it is further determined that the first target data received within the first predetermined time period (for example, the first predetermined time period is 2 hours) is not displayed on the first client 302. Then, for the first target data received at the current time (for example, the current time is 20:00) and the repetitive first target data received within the first predetermined time period (for example, the first predetermined time period is 2 hours), the first client 302 displays only the first target data received at the current time (for example, the current time is 20:00) and pushed by the server.

Description is provided below by using a specific example. In this example, using microblog as an example, it is assumed that the account A on the first client 302 is a fan in microblog, and the account B on the second client 304 is an idol in microblog followed by fans. Assuming that an idol S publishes a piece of first target data at 15:00 today (for example, 4-18), for example, the first target data includes "the star S will participate in a micro interview at 19:00 tomorrow", and the idol S selects a fan a and a fan b to receive the first target data, the server pushes the first target data to the fan a and the fan b at an interval of 1 minute. The fan a happens to be online at 15:00, and after it is determined that the foregoing display control condition is met, the first target data is directly displayed on an interface of the fan a, and the display time is "15:00". The fan b does not update data until 12:00 in the next day (that is, the date 4-19). During the time from 15:00 today, 4-18, to 12:00 in the next day 4-19, because the first target data published by the idol S at 15:00 is not displayed for the fan b, the fan b receives, at an interval of 1 minute, new first target data pushed by the server, and the new first target data replaces the previously received first target data, so that receiving time of the first target data is always kept to be the latest. After the fan b updates data, the first target data participates in the data update with the receiving time of the latest received first target data, so that it is ensured that the first target data can be displayed at a front position on an interface. For example, in this example, the display time of the first target data is "12:00" in the next day 4-19 rather than the time, that is, "15:00" on 4-18, at which the idol S publishes the first target data.

In this embodiment provided by the present invention, the number of times that first target data is received exceeds a predetermined threshold, so that important data pushed by a second client can always be displayed on a most front end, and whenever a user of the first client logs in, the important data published by the second client can be seen as soon as possible, without missing an important message.

As an optional solution, the display control unit 806 further includes:

(1) a second control module, configured to: when it is determined that the number of times that the first client receives the first target data within the first predetermined time period is greater than a first predetermined threshold and the first target data received within the first predetermined time period has been displayed on the first client, skip displaying, on the first client, the first target data received at the current time.

In this embodiment, at least one of the following manners may be used to stop subsequent pushing, to the first client 302, of the first target data published by the second client 304: The first client 302 has displayed the first target data on the interface. The time in which the first client 302 does not display the first target data is greater than a predetermined threshold. For example, when for the account B on the second client 304, it is leaned after determining is performed on the received first target data that, the first target data has been displayed on the interface for the account A on the first client 302 during the last data update (for example, 12:00), the first target data received at the current time (for example, 20:00) is displayed on the first client 302. For another example, when the first target data published by the account B on the second client 304 has been repeatedly pushed for a week, and the first client 302 does not display the first target data, the first target data stops subsequent pushing.

In this embodiment, when the condition that the first target data received within the first predetermined time period has been displayed on the first client 302 is met, the account A on the first client 302 sends, to the account B on the second client 304, a response for stopping subsequent pushing of the first target data.

For example, it is assumed that the first predetermined threshold is 10, the number of times that the account A on the first client 302 receives the first target data within the first predetermined time period (for example, the first predetermined time period is 2 hours) is 120 (that is, receives the first target data every minute), that is, the number of times that the first target data is received is greater than the first predetermined threshold 10, and it is further determined that the first target data received within the first predetermined time period (for example, the first predetermined time period is 2 hours) has been displayed on the first client 302. Then, the first target data received at the current time (for example, the current time is 20:00) is not displayed on the first client 302.

Description is provided below by using a specific example. In this example, using microblog as an example, it is assumed that the account A on the first client 302 is a fan in microblog, and the account B on the second client 304 is an idol in microblog followed by fans. Assuming that an idol S publishes a piece of first target data at 15:00 today (for example, 4-18), for example, the first target data includes "the star S will participate in a micro interview at 19:00 tomorrow", and the idol S selects a fan c to receive the first target data, the server pushes the first target data to the fan c at an interval of 1 minute. The fan c performs update at 18:00 today (for example, 4-18), and receives the first target data, and it is learned by determining that, the first target data has been displayed during the last update before the last logout of the fan c (for example, the logout time is 15:00), and therefore, although the first target data is received at current time 18:00, the first target data is not displayed on an interface of the fan c.

For another example, with reference to the foregoing scenario, a fan d also receives the first target data that is published by the idol S at 15:00 today (for example, 4-18), for example, the first target data includes "the star S will participate in a micro interview at 19:00 tomorrow". However, the fan d does not update data until 20:00 on 4-27 in the next week. Because no refreshing and display are performed for a long time, and a predetermined threshold (for example, a week) is exceeded, display time of the first target data received by the fan d is not 20:00 on 4-27, and only the last moment in a week counted from the publishing time can be retained, that is, 15:00 on 4-25, and the fan d also sends, to the idol S, a response for stopping subsequent pushing of the first target data.

In this embodiment provided by the present invention, it is determined whether first target data received by a first client has been displayed, so that the first client can reduce the disturbance of repeatedly receiving same data.

As an optional solution, the display control unit 806 further includes:

(1) a third control module, configured to determine, at least according to the number of times that the first target data is received within the first predetermined time period, whether the first target data received within the first predetermined time period has been displayed on the first client, and the number of pieces of second target data marked as repetitive received data and having been received within a second predetermined time period before the current time, whether to display, on the first client, the first target data received at the current time, where the number of times that each piece of the second target data marked as repetitive received data is repetitive received by the first client within a third predetermined time period before the current time is greater than a second predetermined threshold.

In this embodiment, the first target data may come from a same client or different clients, which is not limited in this embodiment. In this embodiment, the second target data and the first target data are both repetitive data, but have different data content. In this embodiment, there may be one or more pieces of second target data, but the present disclosure is not limited thereto.

In this embodiment, the second predetermined threshold is used to determine and distinguish that the second target data received by the first client 302 is different from other data received by the first client 302. In this embodiment, a value of the second predetermined threshold may be preconfigured on the first client, but the present disclosure is not limited thereto, different values may be applied to, but not limited to, different scenarios, and the value of the second predetermined threshold is not limited in this embodiment.

In this embodiment, the third predetermined time period may be, but not limited to, a time period before the last logout.

Description is provided below by using an example. For example, it is assumed that the second predetermined threshold is 10, and the number of times that the account A on the first client 302 receives the second target data within the third predetermined time period is 120 (that is, receives the second target data every minute), that is, the number of times that the second target data is received is greater than the second predetermined threshold 10.

In this embodiment, the second predetermined time period may be used to, but not limited to being used to, determine whether the number of pieces of second target data having been displayed within the time period is excessive large, to determine whether the account A on first client 302 is affected. In this embodiment, a value of the second predetermined time period may be preconfigured on the first client 302, but the present disclosure is not limited thereto, different values may be applied to, but not limited to, different scenarios, and the value of the second predetermined time period is not limited in this embodiment. In the foregoing manner, disturbance to the first client 302 can be reduced.

For example, the account A on the first client 302 logs in and performs update at 20:00 today (for example, 4-18), and before that, the account A on the first client 302 once logs in at 12:00 today (for example, 4-18), and keeps online until logout at 15:00. The time period from 15:00 to 20:00 is the first predetermined time period recorded in the foregoing solution, a time period before 15:00 may be set as the third predetermined time period, and the second predetermined time period may be 1 day before current time 20:00, that is, 24 hours before 20:00.

Specific description is provided below with reference to the example shown in Table 4, where Table 4 shows different publishing time of different data published by the account B (for example, the idol S) on the second client 304, login time of the account A (for example, the fan a) on the first client 302, receiving time of first target data and second target data, and display time of displaying the first target data and the second target data.

TABLE 4

| Time | First client 302 (fan a) | | Second client 304 (idol S) |
|---|---|---|---|
| | Received data | Displayed data | Published data |
| 14-4-17 10:00 | "The star S will participate in a micro interview tomorrow" | | "The star S will participate in a micro interview tomorrow" |
| 14-4-18 12:00 (login time) | "The star S will participate in a micro interview tomorrow" | "The star S will participate in a micro interview tomorrow" | |
| 14-4-18 15:00 (logout) | | | |
| 14-4-18 16:00 | "The temperature will drop by 10° C. tomorrow" | | "The temperature will drop by 10° C. tomorrow" |
| 14-4-18 18:00 | "The temperature will drop by 10° C. tomorrow" "So happy today" | | "So happy today" |
| 14-4-18 20:00 (login time) | "The temperature will drop by 10° C. tomorrow" | "The temperature will drop by 10° C. tomorrow" "So happy today" | |

As shown in Table 4, in this example, using microblog as an example, it is assumed that the account A on the first client 302 is a fan a in microblog, and the account B on the second client 304 is an idol S in microblog followed by fans, and it is assumed that the first predetermined threshold and the second predetermined threshold are both 10. It is assumed that the idol S publishes the following data to a fan (for example, the fan a) in a list of the idol S: data published at 10:00 on 4-17 is: "the star S will participate in a micro interview tomorrow"; data published at 16:00 on 4-18 is: "the temperature will drop by 10° C. tomorrow"; and data published at 18:00 on 4-18 is: "so happy today". The number of times that the first piece of data published at 10:00 is received is greater than the predetermined threshold 10, and the number of times that the second piece of data published at 16:00 is received is also greater than the predetermined threshold 10, but the number of times that the third piece of data published at 18:00 is received is only 2, that is, less than the predetermined threshold 10; therefore, only the first piece of data and the second piece of data are marked as repetitive received data. Within the two days, the fan a does not log in until 12:00 on 4-18, and logs out at 15:00, and logs in again at 20:00 on 4-18. Then, the first predetermined time period is from 15:00 to 20:00, 5 hours in total, the third predetermined time period is a time period before 15:00, and the second predetermined time period may be set to 1 day. Within the second predetermined time period, the number of pieces of data that are marked as repetitive received data and can be displayed by the first client 302 is less than a predetermined threshold, where the predetermined threshold may be set to 3 in this example.

Based on the foregoing description, the data repeatedly received by the fan a separately are: 1) the first target data "the temperature will drop by 10° C. tomorrow" published by the idol Sat 16:00 and 2) the second target data "the star S will participate in a micro interview tomorrow" published by the idol S at 10:00. When the fan a logs in at 12:00 on 4-18, and receives one piece of repetitive data, that is, the second target data "the star S will participate in a micro interview tomorrow" published by the idol S at 10:00 on 4-17, which is the first piece of repetitive data received by the fan a in the same day, the server repeatedly pushes the second target data to the fan a at an interval of 1 minute, so that receiving time of the second target data received by the fan a is always the latest, and the second target data is displayed at 12:00 on 4-18 on an interface of the fan a with receiving time being a time point "12:00". After that, when the fan a logs in again at 20:00 on 4-18, the fan a receives again the first target data "the temperature will drop by 10° C. tomorrow" that is published by the idol S at 16:00 on 4-18 and the data "so happy today" that is published by the idol S at 18:00 on 4-18. Whether to display the first target data needs to be further determined by determining whether the number of pieces of second target data having been received within the second predetermined time period (for example, 1 day) before the current time 20:00 and marked as repetitive received data meets a predetermined condition.

Further, in this example, because the number 1 of pieces of target data having been displayed before within the second predetermined time period (for example, 1 day) is less than a predetermined threshold (for example, the predetermined threshold is 3), the first target data, that is, "the temperature will drop by 10° C. tomorrow" can be displayed on the interface of the fan a, and because the data is continuously repeatedly received, receiving time of the first target data is always the latest, so that in this example, although the first target data is published at 16:00 on 4-18, the publishing time point is later than the publishing time 18:00 on 4-18 of the third piece of data (that is, "so happy today"), because the repeated pushing of the first target data updates the receiving time of the first target data, the first target data can be displayed on the interface of the fan a before the ordinary third piece of data. As shown in FIG. 6, the first target data is displayed with receiving time being "20:00" on 4-18, and the ordinary third piece of data is displayed with receiving time being "18:00" on 4-18.

In this embodiment provided by this application, it is determined whether the number of pieces of second target data within a third predetermined time period meets a condition of a third predetermined threshold, to determine whether to display first target data, so that a first client can reduce disturbance from repetitive data.

As an optional solution, the third control module includes:

(1) a first control submodule, configured to: when it is determined that the number of times that the first client receives the first target data within the first predetermined time period is greater than a first predetermined threshold, the first target data received within the first predetermined time period is not displayed on the first client, and the number of pieces of second target data marked as repetitive received data and having been received within the second predetermined time period before the current time is less than or equal to a third predetermined threshold, for the first target data received at the current time and the first target data received within the first predetermined time period, display, on the first client, only the first target data received at the current time; and (2) a second control submodule, configured to: when it is determined that the number of times that the first client receives the first target data within the first predetermined time period is greater than a first predetermined threshold, the first target data received within the first predetermined time period is not displayed on the first client, and the number of pieces of second target data marked as repetitive received data and having been received within the second predetermined time period before the current time is greater than the third predetermined threshold, skip displaying, on the first client, the first target data received at the current time and the first target data received within the first predetermined time period.

In this embodiment, the third predetermined threshold is used to determine whether the number of pieces of target data displayed on the first client within the second predetermined time period is excessively large, to perform control to reduce disturbance to the first client.

For example, as shown in Table 3, using microblog as an example, it is assumed that the account A on the first client 302 is a fan in microblog, and the account B on the second client 304 is an idol in microblog followed by fans. It is assumed that an idol S selects a fan a, a fan b, a fan c, a fan d, and a fan e from a list of the idol S, to receive first target data that is published by the idol S at 15:00. Further, it is assumed that all the fans each time are online for two hours after login, current time is 20:00, and the fans simultaneously log in. In addition, the following assumption may be made for the determining condition of displaying the first target data: whether the number of pieces of second target data having been displayed within a predetermined time (for example, 1 day) for the account A on the first client 302 is less than a third predetermined threshold, and herein, the third predetermined threshold is assumed to be 3.

Description is specifically provided by using the fan b and the fan c in Table 3. The time of the last login of the fan b is 14:00, and the fan b receives, at 15:00, the target data published by the idol S, and it is determined that the fan b has received and displayed one piece of second target data within one day, that is, the number of pieces of second target data that have been received and are marked as repetitive received data is 1, and the number of pieces of second target data having been displayed is less than the predetermined threshold 3; therefore, the first target data published by the idol S at 15:00 can be directly displayed at 15:00, and when the fan b logs in at 20:00, the first target data published by the idol S at 15:00 is not displayed because it has been displayed before. The time of the last login of the fan c is 10:30, the time of the last display of second target data is 12:30, and the fan c receives and displays, at 12:30, a third piece of second target data; therefore, when the fan c logs in at 20:00 and receives the first target data that is published by the idol S at 15:00, because the number of pieces of second target data having been displayed within a predetermined time (for example, 1 day) has been greater than the predetermined threshold 3, the first target data published by the idol S at 15:00 is not displayed for the fan c.

In this embodiment provided by the present invention, a determining condition is set for the number of pieces of second target data having been displayed on the first client, to achieve proper control on the number of pieces of displayed repetitive data, so that not only a user can acquire as soon as possible first target data received at current time, but also no disturbance is caused to the user.

As an optional solution, the third control module further includes:

(1) a determining submodule, configured to: when it is determined that the number of times that the first client receives the first target data within the first predetermined time period is greater than a first predetermined threshold, the first target data received within the first predetermined time period is not displayed on the first client, and the number of pieces of second target data marked as repetitive received data and having been received within the second predetermined time period before the current time is less than or equal to a third predetermined threshold, determine whether a time interval between the current time and receiving time of the last received piece of second target data is greater than a fourth predetermined threshold;

(2) a third control submodule, configured to: when the time interval is greater than the fourth predetermined threshold, for the first target data received at the current time and the first target data received within the first predetermined time period, display, on the first client, only the first target data received at the current time; and (3) a fourth control submodule, configured to: when the time interval is less than or equal to the fourth predetermined threshold, skip displaying, on the first client, the first target data received at the current time and the first target data received within the first predetermined time period.

In this embodiment, the fourth predetermined threshold is used to determine whether a time interval between each two pieces of target data is excessively short, to control a time interval between target data displayed on the first client. In this embodiment, a value of the fourth predetermined threshold may be preconfigured on the first client, but the present disclosure is not limited thereto, different values may be applied to, but not limited to, different scenarios, and the value of the fourth predetermined threshold is not limited in this embodiment.

For example, after the account A on the first client 302 determines that the first target data meets the condition that the number of times of reception is greater than the first predetermined threshold, and further determines that the first target data has not been displayed, and the number of pieces of second target data received within the second predetermined time period before the current time also meets the condition of being less than or equal to the third predetermined threshold, it is further required to determine whether the time interval between the current time and receiving time of the last received piece of second target data is greater than the fourth predetermined threshold. For example, assuming that the fourth threshold is 1 hour, the first target data can be displayed on the first client 302 only when the time interval between the current time and the receiving time of the last received piece of second target data is greater than 1 hour.

Description is specifically provided by using the fan d and the fan e in Table 3. The time of the last login of the fan d is 12:30, and the fan d receives and displays one piece of second target data at 12:00, and the fan d logs out at 14:30 before the pushing time 15:00 at which the idol S publishes the first target data, that is, the fan d has not received, before the last login, the first target data that is published by the idol S at 15:00; when the fan d logs in again at 20:00, because the number of pieces of the second target data having been displayed within a predetermined time (for example, 1 day) is 1 and is less than the predetermined threshold 3, and a time interval between the current time and the time 12:00 of the last display of the second target data is greater than the predetermined threshold 1 hour, the first target data published by the idol S at 15:00 can be displayed for the fan d, and because the first target data is repeatedly pushed by the server, the first target data is inserted at a front position on a display interface of the fan d. The time of the last login of the fan e is 14:00, but the time of the last display of second target data is 14:30; when the fan e receives, at 15:00, the first target data published by the idol S, because a time interval between the first target data to be displayed at the current time and the second target data having been displayed within the predetermined time before the current time is greater than the predetermined threshold 1 hour, and the receiving time of the first target data of the fan e and the receiving time of the last reception of the second target data are respectively 15:00 and 14:30, which are differed by only half an hour, although the fan e is online at 15:00, the first target data published by the idol S at 15:00 still cannot be displayed, until 15:30, the first target data published by the idol S at 15:00 can be displayed for the fan e, and when the fan e logs in at 20:00, because the first target data published by the idol S at 15:00 has been displayed before, the first target data is not displayed at 20:00.

In this embodiment, there may be one or more second clients 304, but the present disclosure is not limited thereto. For example, as shown in FIG. 4, the second client 304 includes a second client 304-1, a second client 304-2, and a second client 304-3, and the clients may separately push different target data to the first client 302. It is assumed that the second client 304-1, the second client 304-2, and the second client 304-3 respectively are an idol S, an idol W, and an idol Q, all the idols have a same fan a, the idol S publishes a piece of data "the star S will participate in a micro interview tomorrow" at 9:00 today, 4-18, the idol W publishes a piece of data "the temperature will drop by 10° C. tomorrow" at 11:00 today, 4-18, and the idol Q publishes a piece of data "so happy today" at 11:30 today, 4-18, where the data published by the idol S and the idol W is marked as repetitive received data. The time of the last login of the fan a is 22:00 yesterday, 4-17, and the fan a logs in again at 12:00 today; assuming that the fan a receives only the three pieces of data within a time period between the two times of login, the data is displayed in sequence, as shown in FIG. 7.

In this embodiment provided by this application, an interval between display time of each two pieces of repetitive received data is limited, to achieve proper control on display of target data.

In the foregoing embodiments of the present invention, the description of each embodiment has respective focuses, and for the part that is not detailed in an embodiment, reference may be made to the relevant description of other embodiments.

In the several embodiments provided in the present disclosure, it should be understood that the disclosed client may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic, mechanical, or other forms.

The units described as separate components may or may not be physically separate, and components displayed as units may or may not be physical units, and may be located at one position, or may be distributed on multiple network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium, and executed by one or more processors on a terminal. Based on such an understanding, the technical solutions of the present disclosure essentially, or the part contributing to the prior art, or all or some of the technical solutions may be implemented in a form of a software product. The computer software product is stored in a storage medium and includes several instructions for instructing a computer device (which may be a personal computer, a server, or a network device) to perform all or some of the steps of the methods in the embodiments of the present invention. The foregoing storage medium includes: any medium that can store program code, such as a USB flash drive, a ROM, a RAM, a removable hard disk, a magnetic disk, or an optical disc.

The foregoing descriptions are merely preferred implementation manners of the present invention, and it should be noted that, persons of ordinary skill in the art may make various improvements and refinements without departing from the principle of the present disclosure. All such improvements and refinements shall fall within the protection scope of the present disclosure.

What is claimed is:

1. A control method for data display, applied to a terminal, the terminal comprising a memory, one or more processors, and program instructions stored in the memory and executed by the one or more processors, the program instructions being used to execute the method, and the method comprising:

receiving, by a first client at current time, first target data pushed by a second client;

determining, by the first client, whether the first target data pushed by the second client has been received within a first predetermined time period before the current time; and determining, by the first client at least according to the number of times that the first target data is received within the first predetermined time period and whether the first target data received within the first predetermined time period has been displayed on the first client, whether to display, on the first client, the first target data received at the current time if the first client determines that the first client has received, within the first predetermined time period, the first target data pushed by the second client;

wherein the determining, by the first client at least according to the number of times that the first target data is received within the first predetermined time period and whether the first target data received within the first predetermined time period has been displayed on the first client, whether to display, on the first client, the first target data received at the current time comprises:

determining, by the first client at least according to the number of times that the first target data is received within the first predetermined time period, whether the first target data received within the first predetermined time period has been displayed on the first client, and the number of pieces of second target data marked as repetitive received data and having been received within a second predetermined time period before the current time, whether to display, on the first client, the first target data received at the current time, wherein the number of times that each piece of the second target data marked as repetitive received data is repetitive received by the first client within a third predetermined time period before the current time is greater than a second predetermined threshold.

2. A control method for data display, applied to a terminal, the terminal comprising a memory, one or more processors, and program instructions stored in the memory and executed by the one or more processors, the program instructions being used to execute the method, and the method comprising:

receiving, by a first client at current time, first target data pushed by a second client;

determining, by the first client, whether the first target data pushed by the second client has been received within a first predetermined time period before the current time; and determining, by the first client at least according to the number of times that the first target data is received within the first predetermined time period and whether the first target data received within the first predetermined time period has been displayed on the first client, whether to display, on the first client, the first target data received at the current time if the first client determines that the first client has received, within the first predetermined time period, the first target data pushed by the second client;

wherein the determining, by the first client at least according to the number of times that the first target data is received within the first predetermined time period and whether the first target data received within the first predetermined time period has been displayed on the first client, whether to display, on the first client, the first target data received at the current time comprises:

for the first target data received at the current time and the first target data received within the first predetermined time period, displaying, by the first client on the first client, only the first target data received at the current time if the first client determines that the number of times that the first client receives the first target data within the first predetermined time period is greater than a first predetermined threshold and the first target data received within the first predetermined time period is not displayed on the first client;

skipping, by the first client, displaying, on the first client, the first target data received at the current time if the first client determines that the number of times that the first client receives the first target data within the first predetermined time period is greater than a first predetermined threshold and the first target data received within the first predetermined time period has been displayed on the first client.

3. The method according to claim 1, wherein the determining, by the first client at least according to the number of times that the first target data is received within the first predetermined time period, whether the first target data received within the first predetermined time period has been displayed on the first client, and the number of pieces of second target data marked as repetitive received data and having been received within a second predetermined time period before the current time, whether to display, on the first client, the first target data received at the current time comprises:

for the first target data received at the current time and the first target data received within the first predetermined time period, displaying, by the first client on the first client, only the first target data received at the current time if the first client determines that the number of times that the first client receives the first target data within the first predetermined time period is greater than a first predetermined threshold, the first target data received within the first predetermined time period is not displayed on the first client, and the number of pieces of second target data marked as repetitive received data and having been received within the second predetermined time period before the current time is less than or equal to a third predetermined threshold; or skipping, by the first client, displaying, on the first client, the first target data received at the current time and the first target data received within the first predetermined time period if the first client determines that the number of times that the first client receives the first target data within the first predetermined time period is greater than a first predetermined threshold, the first target data received within the first predetermined time period is not displayed on the first client, and the number of pieces of second target data marked as repetitive received data and having been received within the second predetermined time period before the current time is greater than the third predetermined threshold.

4. The method according to claim 1, wherein the determining, by the first client at least according to the number of times that the first target data is received within the first predetermined time period, whether the first target data received within the first predetermined time period has been displayed on the first client, and the number of pieces of second target data marked as repetitive received data and having been received within a second predetermined time period before the current time, whether to display, on the first client, the first target data received at the current time comprises:

determining, by the first client, whether a time interval between the current time and receiving time of the last received piece of second target data is greater than a fourth predetermined threshold if the first client determines that the number of times that the first client receives the first target data within the first predetermined time period is greater than a first predetermined threshold, the first target data received within the first predetermined time period is not displayed on the first client, and the number of pieces of second target data marked as repetitive received data and having been received within the second predetermined time period before the current time is less than or equal to a third predetermined threshold; and for the first target data received at the current time and the first target data received within the first predetermined time period, displaying, by the first client on the first client, only the first target data received at the current time if the time interval is greater than the fourth predetermined threshold; or skipping, by the first client, displaying, on the first client, the first target data received at the current time and the first target data received within the first predetermined time period if the time interval is less than or equal to the fourth predetermined threshold.

5. The method according to claim 1, wherein the second target data comes from a same client or different clients.

6. A control apparatus for data display, located in a first client, the first client running in a terminal, the terminal comprising a memory storing the control apparatus and a processor executing one or more program units in the control apparatus, and the one or more program units comprising:
   a receiving unit, configured to receive, at current time, first target data pushed by a second client;
   a determining unit, configured to determine whether the first target data pushed by the second client has been received within a first predetermined time period before the current time; and
   a display control unit, configured to: when it is determined that the first client has received, within the first predetermined time period, the first target data pushed by the second client, determine, at least according to the number of times that the first target data is received within the first predetermined time period and whether the first target data received within the first predetermined time period has been displayed on the first client, whether to display, on the first client, the first target data received at the current time;
   wherein the display control unit further comprises:
   a third control module, configured to determine, at least according to the number of times that the first target data is received within the first predetermined time period, whether the first target data received within the first predetermined time period has been displayed on the first client, and the number of pieces of second target data marked as repetitive received data and having been received within a second predetermined time period before the current time, whether to display, on the first client, the first target data received at the current time, wherein the number of times that each piece of the second target data marked as repetitive received data is repetitive received by the first client within a third predetermined time period before the current time is greater than a second predetermined threshold.

7. The apparatus according to claim 6, wherein the third control module comprises:
   a first control submodule, configured to: when it is determined that the number of times that the first client receives the first target data within the first predetermined time period is greater than a first predetermined threshold, the first target data received within the first predetermined time period is not displayed on the first client, and the number of pieces of second target data marked as repetitive received data and having been received within the second predetermined time period before the current time is less than or equal to a third predetermined threshold, for the first target data received at the current time and the first target data received within the first predetermined time period, display, on the first client, only the first target data received at the current time; and
   a second control submodule, configured to: when it is determined that the number of times that the first client receives the first target data within the first predetermined time period is greater than a first predetermined threshold, the first target data received within the first predetermined time period is not displayed on the first client, and the number of pieces of second target data marked as repetitive received data and having been received within the second predetermined time period before the current time is greater than the third predetermined threshold, skip displaying, on the first client, the first target data received at the current time and the first target data received within the first predetermined time period.

8. The apparatus according to claim 6, wherein the third control module further comprises:
   a determining submodule, configured to: when it is determined that the number of times that the first client receives the first target data within the first predetermined time period is greater than a first predetermined threshold, the first target data received within the first predetermined time period is not displayed on the first client, and the number of pieces of second target data marked as repetitive received data and having been received within the second predetermined time period before the current time is less than or equal to a third predetermined threshold, determine whether a time interval between the current time and receiving time of the last received piece of second target data is greater than a fourth predetermined threshold;
   a third control submodule, configured to: when the time interval is greater than the fourth predetermined threshold, for the first target data received at the current time and the first target data received within the first predetermined time period, display, on the first client, only the first target data received at the current time; and
   a fourth control submodule, configured to: when the time interval is less than or equal to the fourth predetermined threshold, skip displaying, on the first client, the first target data received at the current time and the first target data received within the first predetermined time period.

9. The apparatus according to claim 6, wherein the second target data comes from a same client or different clients.

* * * * *